Patented Sept. 12, 1950

2,521,770

UNITED STATES PATENT OFFICE 2,521,770

SELECTIVE CARBON ADSORPTION OF IMPURITIES FROM ACIDIC STREPTOMYCIN SOLUTIONS

Robert D. Babson and Max Tishler, Rahway, N. J., assignors to Merck & Co., Inc., Rahway, N. J., a corporation of New Jersey No Drawing. Application June 8, 1946, Serial No. 675,323

7 Claims. (Cl. 260—210)

This invention relates to processes for preparing streptomycin and particularly to new procedures for removing impurities from aqueous solutions containing streptomycin.

The production of streptomycin by cultivation of strains of the organism *Actinomyces griseus* in suitable culture medium was first reported by Schatz, Bugie, and Waksman in Proceedings of the Society for Experimental Biology and Medicine 55, 66–69 (1944). According to this publication, the streptomycin was recovered from the culture broth by adsorbing it on activated charcoal at neutrality, eluting with dilute mineral acid followed by neutralizing the eluate, drying, and treating to remove inorganic matter.

In accordance with an improved procedure of one of our colleagues A. Walti, which is fully disclosed in his pending application Serial No. 577,143, filed February 9, 1945, now Patent No. 2,481,267, streptomycin, adsorbed on activated charcoal, is eluted by treating a low normality aqueous-alcoholic solution of a lower aliphatic carboxylic acid. In this procedure the difficulties and losses encountered in separating inorganic salts are overcome.

In practice, both of the procedures referred to above are found to be unsatisfactory in that excessive amounts of organic impurities are adsorbed and eluted together with the streptomycin. These impurities hamper subsequent working up of the streptomycin for therapeutic uses by reducing the potency of and imparting toxicity to the product.

It is now discovered, in accordance with the present invention, that considerable amounts of organic impurities can be removed, and a product of increased potency can be produced in better yield by treating streptomycin in aqueous solution at an acid pH, i. e., pH 1 to 4, with activated charcoal. By this treatment, impurities are adsorbed upon the charcoal while streptomycin remains in solution. (At pH's above 4 some streptomycin will be lost by adsorption on the charcoal.) Various streptomycin solutions can be treated in this manner including original filtered streptomycin culture broth, acid eluates obtained by procedures mentioned above, and other aqueous streptomycin solutions in various stages of purification. The removal of impurities from streptomycin culture broth by charcoal treatment under acid conditions is preferably followed by adsorption of streptomycin on activated charcoal under neutral conditions, and elution with aqueous or aqueous-alcoholic acid, in which latter treatment certain additional impurities are removed in the neutral liquor and washings prior to elution.

Regarded in certain of its broader aspects, the novel process of the present invention comprises acidifying an aqueous streptomycin solution to a pH of about 1.5 to 5.0, treating the acid solution thus formed with activated charcoal, filtering off the activated charcoal and adsorbed impurities, and recovering purified streptomycin from the filtrate.

In carrying out the process of the present invention, the aqueous streptomycin solution can be adjusted to a pH of 1.5 to 5.0, and preferably to a pH of about 2.2, by the addition of any strong non-oxidizing mineral or organic carboxylic acid. Thus, hydrochloric acid, sulfuric acid, phosphoric acid, formic acid, acetic acid, and propionic acid can be used while an oxidizing acid such as nitric acis is not satisfactory.

To the acidified solution is added about 1 to 5% (by weight) of activated charcoal and the mixture is stirred for about 15 minutes. The activated charcoal is then filtered off and washed with water, preferably using an amount of water equal to about one-fourth the volume of the original solution. The charcoal filter cake, containing impurities and an insignificant amount of streptomycin, is discarded.

The combined filtrate and washings can be worked up in various ways to recover solid streptomycin. If the starting solution is an acid eluate from one of the former processes above mentioned, or is a partially purified aqueous solution of streptomycin obtained by other means, the solid streptomycin can be recovered by concentrating the combined filtrate and washings to small volume (0.1 to 0.3% of the original volume) by heating in vacuo at about 50° C., adding to the volume of concentrate thus obtained about five volumes of methanol and fifty volumes of acetone causing precipitation of streptomycin, separating the precipitate by centrifuging, washing the solid with acetone, and drying.

When the starting solution is a streptomycin culture broth, the combined filtrate and washings above mentioned are preferably worked up as follows. The pH of the solution (filtrate and washings) is adjusted to about 6.6 by addition of alkali such as 30% sodium hydroxide. Any precipitate formed during neutralization is filtered off and the clear filtrate is treated with about 1 to 5% (by weight) of activated charcoal, the streptomycin being adsorbed. The charcoal is washed with water, or with aqueous-alcohol, then preferably slurried with a lower aliphatic alcohol such as methanol, ethanol, or the like, and filtered. Streptomycin is then eluted from the charcoal by adding water, treating the mixture with a strong non-oxidizing mineral or organic acid until the pH remains constant at 1 to 4 and preferably at about 2.2, and filtering. (If a mineral acid is used in elution, the filtrate is neutralized to about pH 6.5). The filtrate is then concentrated to small volume by heating in vacuo at about 50° C., and streptomycin is recovered from the concentrate by precipitation from methanol-acetone as above described.

The overall recovery of active product by the process of the present invention is as good as, or better than, the recovery by former methods; and the purity or potency of the product is at least 50 to 60% greater than the potency of comparable products obtained by former methods.

The present procedure can, if desired, be followed by a further purification involving adsorption of streptomycin on charcoal at a strongly alkaline pH (i. e. a pH of about 8 to 11) as fully disclosed and claimed in a copending application, Bittenbender and Babson, Serial No. 675,322, filed June 8, 1946.

As different grades of charcoal, and for that matter different batches of the same grade, differ considerably in activity, it will be understood that the amount of charcoal required, within the ranges specified, will depend upon the activity of the particular charcoal available. It will also be understood that the per cent by weight of charcoal can also be expressed in terms of weight per volume of solution. Thus, 2% by weight of charcoal is approximately equivalent to 20 g. per liter of solution.

The advantages of the new purification procedure are demonstrated in the following examples, which are given by way of illustration and not of limitation.

EXAMPLE I

Former procedure 1000 cc. of streptomycin culture broth (activity 121 U./cc.) was filtered, and to the filtrate was added 20 g. of activated charcoal (Darco G-60). After thorough mixing, the charcoal was filtered off and the filter cake was washed with about 500 cc. of water, and then slurried in 75 cc. of ethanol. The slurry was filtered and adsorbed streptomycin was eluted from the charcoal by mixing the charcoal with about 100 cc. of water, treating the mixture with 1.0 to 3.0 cc. of 88% formic acid until the pH remained constant at 2.2, and filtering. The filtered eluate was concentrated to 1-2 cc. in vacuo at 50° C. The streptomycin concentrate was dissolved in 5 cc. of methanol and to this solution was added 50 cc. of acetone causing formation of a precipitate. The precipitate was separated by centrifuging, washed with two 10 cc. portions of acetone, and dried in vacuo, yielding 0.52 g. of product having an activity of 143 U./mg. (Overall recovery of activity equals 62%.)

EXAMPLE II

New procedure 1000 cc. of streptomycin culture broth (activity 121 U./cc.) was adjusted to pH 2.2 with 10-15 cc. of 85% phosphoric acid and stirred for 15 minutes with 20 g. of activated charcoal (Darco G-60). The charcoal was filtered off and washed with 250 cc. of water. This charcoal contains impurities and an insignificant amount of streptomycin. The filtrate and washings were combined and adjusted to pH 6.5 with 30% sodium hydroxide. A small amount of flocculent precipitate which separated was filtered and the clear filtrate was treated with 20 g. of activated charcoal (Darco G-60). The charcoal adsorbate was washed with 250 cc. of water, slurred with 75 cc. of methanol, and filtered.

The adsorbed streptomycin was then eluted from the charcoal and worked up as in Example I, yielding 0.31 g. of product having an activity of 250 U./mg. (Overall recovery of activity equals 64%.)

EXAMPLE III

Former procedure 300 cc. of acid streptomycin eluate having an activity of 90 U./cc., and obtained by elution from a charcoal adsorbate, was concentrated to 0.3 to 1.0 cc. in vacuo at 50° C. The streptomycin concentrate was dissolved in methanol, precipitated by addition of acetone, and worked up as described in Example I, yielding 0.3 g. of product having an activity of 90 U./mg. (Recovery of activity from eluate equals 100%.)

EXAMPLE IV

New procedure 300 cc. of acid streptomycin eluate having an activity of 90 U./cc., and obtained by elution from a charcoal adsorbate, was adjusted to pH 2.2 with formic acid and treated with 15 g. of activated charcoal (Darco G-60). The mixture was stirred for about 15 minutes and the charcoal was filtered off and washed with about 80 cc. of water. The charcoal contains impurities and an insignificant amount of streptomycin. The combined filtrate and washings were concentrated to 0.3 to 1.0 cc. in vacuo at 50° C., and the streptomycin concentrate was dissolved in methanol, precipitated by addition of acetone, and worked up as in Example I, yielding 0.203 g. of product having an activity of 133 U./mg. (Recovery of activity from eluate equals 100%.)

EXAMPLE V

New procedure 2000 cc. of streptomycin culture broth (activity 72 U./mg.) was adjusted to pH 2.2 with 15-25 cc. of phosphoric acid and stirred for 15 minutes with 40 g. of activated charcoal (Darco G-60). The charcoal was filtered off and washed with 50 cc. of water. This charcoal, containing mainly impurities, was discarded. The filtrate and washings were combined and adjusted to pH 6.6 with 30% sodium hydroxide, and filtered to remove a small amount of flocculent precipitate which separated. The clear filtrate was treated with 30 g. of activated charcoal (Darco G-60). The charcoal was filtered, washed with 500 cc. of water, and slurried with 150 cc. of methanol. After filtering, the charcoal was suspended in about 150 cc. of water, acidified to pH 3.0 with hydrochloric acid to elute the absorbed streptomycin. The mixture was then filtered and the charcoal was washed with about 50 cc. of water. The combined filtrate and washings were neutralized to pH 6.5, concentrated to about 2 cc. in vacuo at 50° C. The streptomycin concentrate was dissolved in methanol and acetone was then added, forming a precipitate which was worked up as in Example I, yielding 0.41 g. of product having an activity of 244 U./mg. (Overall recovery of activity equals 69%.)

Modifications of the foregoing procedures can be made without departing from the spirit and scope of the present invention, and we are to be limited only by the appended claims.

We claim:

1. The process that comprises acidifying an aqueous streptomycin solution to a pH of about 1.5 to 5.0, treating the acid solution thus formed with activated charcoal, filtering off the activated charcoal and adsorbed impurities, and recovering purified streptomycin from the filtrate.

2. The process that comprises acidifying a streptomycin culture broth to a pH of about 1.5 to 5.0, treating the acid solution thus formed with activated charcoal, filtering off the activated charcoal and adsorbed impurities, and recovering purified streptomycin from the filtrate.

3. The process that comprises acidifying a streptomycin eluate obtained by elution of a charcoal adsorbate to a pH of about 1.5 to 5.0, treating the acid solution thus formed with activated charcoal, filtering off the activated charcoal and adsorbed impurities, and recovering purified streptomycin from the filtrate.

4. The process that comprises acidifying an aqueous streptomycin solution to a pH of about 2.2, treating the acid solution thus formed with activated charcoal, filtering off the activated charcoal and adsorbed impurities, and recovering purified streptomycin from the filtrate.

5. In the purification of streptomycin, the steps that comprise adjusting the pH of an aqueous streptomycin solution to about 2.2 by addition of a strong non-oxidizing acid, thoroughly mixing with the acid solution about a 2 to 5% by weight of activated charcoal, filtering off the charcoal and adsorbed impurities, and recovering purified streptomycin from the filtrate.

6. A process for recovering streptomycin of high potency from a streptomycin culture broth that comprises adjusting the pH of the culture broth to about 2.2 by addition of a strong non-oxidizing acid, thoroughly mixing with the acid solution about 2 to 5% by weight of activated charcoal, filtering off the charcoal and adsorbed impurities, adjusting the pH of the filtrate to about 6.6 by addition of alkali, thoroughly mixing with the neutralized solution about 2% by weight of activated charcoal, thereby adsorbing streptomycin on the charcoal, filtering off the charcoal adsorbate and eluting streptomycin from the charcoal adsorbate by treating with an aqueous solution of a strong non-oxidizing acid at a pH of about 1 to 4, and recovering purified streptomycin from the eluate.

7. A process for recovering streptomycin of high potency from a streptomycin culture broth that comprises adjusting the pH of the culture broth to about 2.2 by addition of a strong non-oxidizing acid, thoroughly mixing with the acid solution about 2 to 5% by weight of activated charcoal, filtering off the charcoal and adsorbed impurities, adjusting the pH of the filtrate to about 6.6 by addition of alkali, thoroughly mixing with the neutralized solution about 2% by weight of activated charcoal, thereby adsorbing streptomycin on the charcoal, filtering off the charcoal adsorbate and washing first with water and then with a lower aliphatic alcohol, eluting streptomycin from the charcoal adsorbate by treating with an aqueous solution of a strong non-oxidizing acid at a pH of about 1 to 4, and recovering purified streptomycin from the eluate.

ROBERT D. BABSON.
MAX TISHLER.

REFERENCES CITED

The following references are of record in the file of this patent:

Waksman et al., Proc. Soc. Exptl. Biol., Med. 49, 207–210 (1942).

Schatz et al., Proc. Soc. Exptl. Biol., Med. 55, 66–69 (1944).

Waksman et al., J. Am. Pharm. Assoc., 34, 273–279 (1945).

Quarendon., Manuf. Chemist and Manuf. Perfumer, 14, 251–254 (1943).

Jour. Biol. Chem., vol. 160 (1945), pp. 337–342.